United States Patent

Freeman

[11] 3,796,886
[45] Mar. 12, 1974

[54] RADIANT ENERGY REFLECTORS

[75] Inventor: Miller L. Freeman, Burbank, Calif.

[73] Assignee: John W. Ervin, Beverly Hills, Calif.; a part interest

[22] Filed: May 18, 1973

[21] Appl. No.: 361,452

[52] U.S. Cl. .................. 250/493, 250/503, 240/41.3
[51] Int. Cl. ............................................. H01j 5/02
[58] Field of Search ............ 313/111, 114; 250/494, 250/493, 503; 350/294, 235, 236; 240/41.3

[56] References Cited
UNITED STATES PATENTS

| | | | |
|---|---|---|---|
| 3,443,086 | 5/1969 | Rikis | 240/41.1 |
| 2,198,014 | 4/1940 | Ott | 350/294 |
| 3,589,799 | 6/1971 | Hotchkiss | 250/237 |

Primary Examiner—Archie R. Borchelt
Assistant Examiner—B. C. Anderson
Attorney, Agent, or Firm—Edwin A. Oser

[57] ABSTRACT

A light projector particularly suitable for automobile headlights which will direct the light to provide separate beams substantially without energy loss. The light projector is provided with a rear reflector which may be of parabolic shape or partially or entirely of the shape of an anamorphoscope. It has a second rear reflector of elliptical shape having one of its focal points in the light source. There is also provided a spherical front reflector having its origin in the light source. The front reflector has an aperture located in the second focal point of the elliptical rear reflector. A planoconvex lens may be provided having its focal point in the aperture of the front reflector to project an intense light beam having the shape of the aperture. This will now provide two light beams of different intensity, one being very intense which may be of rectangular shape corresponding to the shape of the aperture. The projector may also be used to direct or project any radiant energy such as electromagnetic waves or sound waves.

7 Claims, 9 Drawing Figures

PATENTED MAR 12 1974  3,796,886

PATENTED MAR 12 1974  3,796,886

RADIANT ENERGY REFLECTORS

BACKGROUND OF THE INVENTION

This invention relates generaly to radiant energy reflecting systems and particularly relates to a light beam projector which directs the light in an intense beam of predetermined shape surrounded by a beam of less intensity substantially without loss of energy.

It is well known that light projectors and particularly automobile headlights may cause considerable glare to practically blind the driver of an approaching vehicle. It is also known that this may cause accidents. Furthermore, such light projectors are inefficient because the light energy that is directed upwards to cause the undesirable glare is completely wasted.

Various attempts have been made in the past to minimize the danger caused by the light beam of a projector being directed in an undesired direction. Thus, it has been proposed to absorb the light which is normally directed in an upward direction. This absorbed energy is transformed into undesirable heat. This generation of heat is particularly detrimental for sealed beam headlights of a car because the sealed interior space of the lamp is not easy to cool.

It is accordingly an object of the invention to provide a light projector capable of improving the vision of the driver of a vehicle so equipped and which avoids impairing the vision of the driver of an oncoming vehicle.

A further object of the present invention is to provide a radiant energy projector which substantially wastes none of the radiant energy but directs it into a desired direction and which creates an intense portion of the beam of desired shape for better illumination of the road in the case of an automobile headlight.

Another object of the invention is to provide apparatus for directing radiant energy which may consist of two separate energy directing elements each having an axis whereby the two axes may form an angle with each other to further control the direction and intensity of the projected energy.

SUMMARY OF THE INVENTION

This is accomplished in accordance with the present invention by providing two specially shaped rear reflectors, a front reflector having an aperture of predetermined shape and a lens for directing a focused energy beam. Since all of these elements except the front lens are radiant energy reflectors there is a minimum of undesirable chromatic aberration which is inherent in any energy refractor. Therefore, the radiant energy reflector of the invention may be used over a large range of the electromagnetic specturm. It may also be used for other radiant energies such, for example, as sound energy.

Specifically, the apparatus of the present invention comprises a source of radiant energy. A first rear reflector of substantially parabolic shape has its focal point substantially in the energy source. There is also provided a second rear reflector of substantially elliptical shape forming a portion of an ellipsoid and disposed between the energy source and the first rear reflector. The ellipsoid, of course, has two focal points one of which is located substantially in the energy source.

There are further provided a front reflector of substantially spherical shape having its origin in the energy source. The front reflector forms a portion of a sphere and has an aperture therein of predetermined shape such, for example, as a rectangular shape. The aperture is in the second focal point of the second, elliptical rear reflector. Finally, the lens may be disposed in the path of the energy which has its focal point substantially in the aperture for directing a focused beam in a forward direction.

As a result the front reflector collects substantially all of the light which would otherwise pass through the opening of the parabolic rear reflector and directs it into the second or elliptical rear reflector. The elliptical rear reflector in turn focuses all of this light in the aperture of the front reflector to create an intense focused beam which may, for example, serve the purpose to illuminate the road in a farther forward direction.

The apparatus of the invention may be further improved by providing an angle between the common axis of the second rear reflector and the front reflector and the axis of the parabolic rear reflector. Furthermore, either the upper portion or the entire first rear reflector may have the shape of an anamorphoscope to further compress the beam directed in a forward direction.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
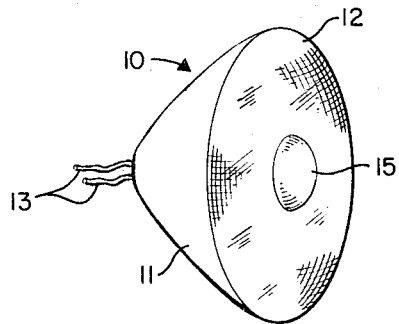
FIG. 1 is a view in perspective of a sealed beam lamp suitable for use with an automobile and embodying the present invention.

Referring now to the drawings and particularly to FIG. 1, there is illustrated by way of example a sealed beam headlight lamp 10 for use with an automobile. As explained before, it will be understood that the apparatus of the invention may not only be used as a projector of light but may be generally used for all forms of radiant energy including sound energy. As shown in FIG. 1, the sealed beam lamp 10 is provided with a metallic envelope 11 and a front window 12 transparent to the light or in general to the radiant energy. A pair of leads 13 extend from the envelope 11 and may be used for energizing the light source. There may also be provided a lens 15 which may be disposed on the front window 12 as will be more fully explained hereinafter.

Figure 2:
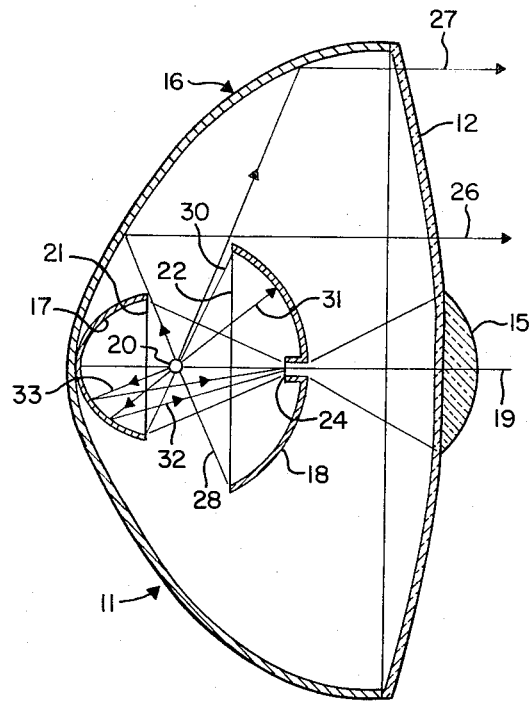
FIG. 2 is a vertical sectional view of a light projector in accordance with the present invention.
Figure 3:
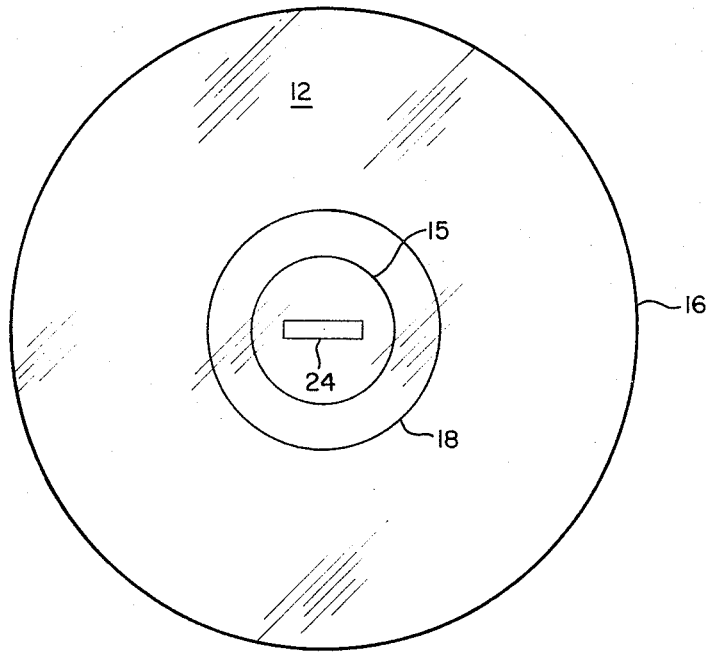
FIG. 3 is a front elevational view of the projector of FIG. 2.

Referring now specifically to FIGS. 2 and 3, there is illustrated a first embodiment of the present invention. It includes generally a first rear reflector 16, a second rear reflector 17, a front reflector 18 and the plano-convex lens 15. The first rear reflector 16 may be of parabolic shape as shown and has its focal point substantially coincident with the light source 20.

The second rear reflector 17 is of substantially elliptical shape and forms a portion of an ellipsoid. Like any ellipsoid it has two focal points, one of which substantially coincides with the light source 20. It will be noted that the second rear reflector 17 forms a portion of an ellipsoid with an opening defined by a plane 21 spaced rearwardly of the light source 20 and which intersects at right angles the common axis 19 of the rear reflectors 16, 17 and the front reflector 18.

The front reflector 18 is of spherical shape and has its origin in the light source 20. It forms a portion of a sphere having an opening defined by a plane 22 which is substantially parallel to the plane 21 passing through the opening of the second rear reflector 17. Furthermore, the front reflector 18 is provided with an aperture 24 which as clearly shown in FIG. 3 is preferably of rectangular shape. It is situated in the second focal point of the second rear reflector 17 forming an ellipsoid. Also, the plano-convex lens 15 has its focal point in the aperture 24.

The operation of the projector of FIGS. 2 and 3 will now be described. It is well known that a paraboloid has the property that any energy rays originating from its focal point are directed outwardly as a parallel beam. This is illustrated by the light rays 26 and 27. It will also be noted by an inspection of light rays 28 and 30, that the front reflector 18 is so arranged and is of such a size that to intercept all light rays originating from the light source e 20 which would otherwise pass through the opening of the rear reflector 16. This of course means that there are not diverging light rays because all light rays not intercepted by either the second rear reflector 17 or by the front reflector 18 are directed as focused beam by the first rear reflector 16.

The function of the front reflector 18 is to intercept light rays such as shown at 31 and direct them back through the light source 20 onto the elliptical rear reflector 17 where they appear as a light ray 32 which now passes through the aperture 24. This is due to the fact that all light rays originating in one focal point of the ellipsoid 17 are directed toward the second focal point, that is through the aperture 24. Similarly, any light rays such as 33 which are directed from the light source 20 to the second rear reflector 17 are also directly passed through the aperture 24.

Figure 4:
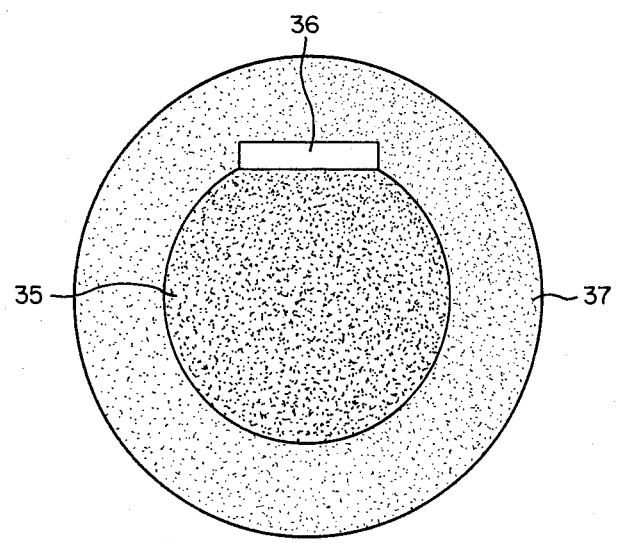
FIG. 4 is a cross-sectional schematic view of a light beam projected by the light projector of FIGS. 2 and 3.

It will now be seen that the resulting light beam has a shape illustrated in FIG. 4. It has a central portion 35 which is substantially not illuminated. This is the portion formed by the projection of the front reflector 18. It has an intense light beam 36 of rectangular shape corresponding to the shape of the aperture 24 focused by the lens 15. It also has an outer light beam 37 of ring shape which is less intense than the light beam 36 but is focused. For use as an automobile headlight the beam configuration illustrated in FIG. 4 is preferred. Accordingly, the intense light beam 36 can be so directed as to illuminate the road further ahead of the car than is possible with conventional light projectors. Nevertheless, the second rear reflector 17 and front reflector 18 focus a complete image. FIG. 4 of course illustrates the cross section of the beam leaving the projector. At the target of the beam it can be focused as a homogenous circle or flat top and or bottom of any desired size.

The focusing lens 15 may be constructed in various ways to suit different applications. It may be an achromatic lens composed of several elements to minimize chromatic aberration. In case the projector is used for focusing microwaves it may consist of metal. Alternatively, the lens 15 may be made transparent to sound waves to focus such mechanical waves. It may include an interference filter to pass only certain wavelengths for laser applications or to pass only selected colors.

Figure 5:
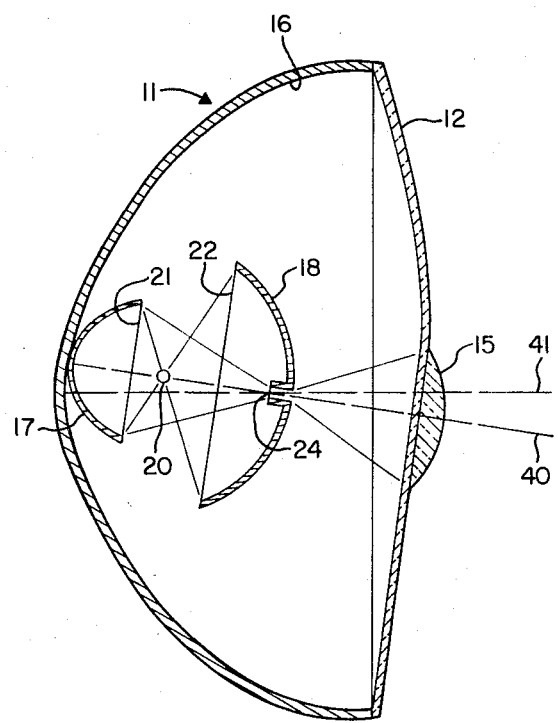
FIG. 5 is a vertical sectional view of a modified light projector where the common axis of the second rear reflector and the front reflector forms and angle with the axis of the first parabolic rear reflector.

Another embodiment of the present invention is illustrated in FIG. 5. Here the three elements consisting of the second rear reflector 17, the front reflector 18 and the lens 15 jointly have a common axis 40 which forms an angle with the axis 41 of the first parabolic rear reflector 16. This arrangement permits to change the direction of the intense light beam 36 with respect to the annular light beam 37 and to direct it in a downward or upward direction to any desired degree. It will of course be understood that the angle between the axis 40 and 41 has been shown exaggerated in FIG. 5. The front window 12 may have to be tilted slightly to accommodate the lens 15 which of course is arranged symmetrically to its axis 40.

The two projector systems consisting of the second rear reflector 17, the front reflector 18 and the lens 15, on the one hand, and the first rear reflector 16, on the other hand, may be made independently sensitive to radiation in different ranges such as heat and light or colors in the visible spectrum, or even sound and electromagnetic waves.

Figure 6:
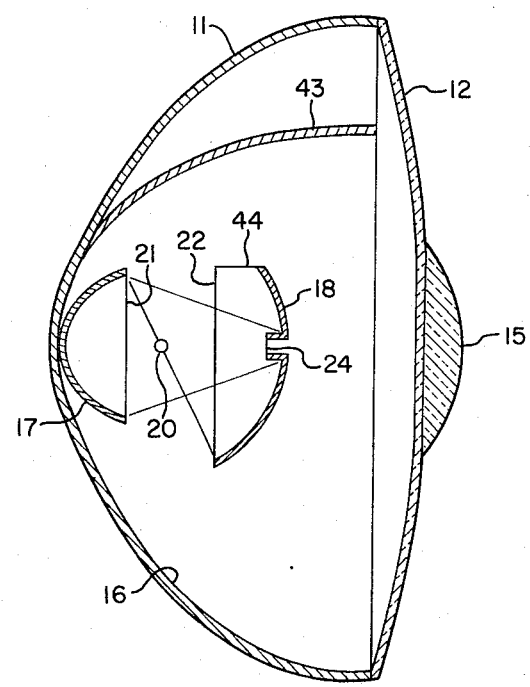
FIG. 6 is a vertical sectional view of another embodiment of the present invention which will provide a light beam having a substantially flat top of high intensity.
Figure 7:
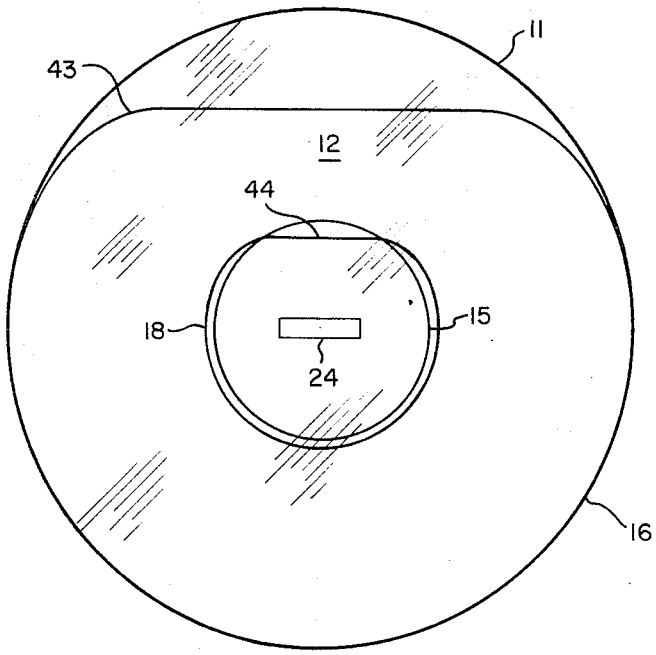
FIG. 7 is a front elevational view of the projector of FIG. 6.

Another embodiment of the present invention is illustrated in FIGS. 6 and 7 which will now be described. Thie embodiment permits to provide an annular beam 37 as shown in FIG. 4 which has a substantially flat top of higher intensity. This is achieved by making the upper portion 43 of the first rear projector 16 in the shape of an anamorphoscope. An anamorphoscope reflector has the properties of a cylindrical lens, that is it compresses light rays in a predetermined plane. The remainder of the light projector of FIGS. 6 and 7 may have the same shape as shown in FIGS. 2 and 3 except for the front reflector 18 which may have its upper portion cut off as shown at 44 to provide a straight edge. The front reflector 18 need only extend upwardly sufficiently to intercept light rays which would otherwise be able to pass through the upper portion of the opening of the first rear reflector 43.

It will be noted that the upper portion 43 of the rear reflector 16 having the shape of an anamorphoscope is spaced from the envelope 11. The envelope 11 may retain its conventional shape so that the light projector of the invention may simply be embodied or inserted into a conventional headlight housing.

It will now be evident that the light projector FIGS. 6 and 7 will compress the upper edge of the light beam 37. At the same time this upper portion will be more intense because the light rays have been compressed or concentrated by the anamorphoscope.

Figure 8:
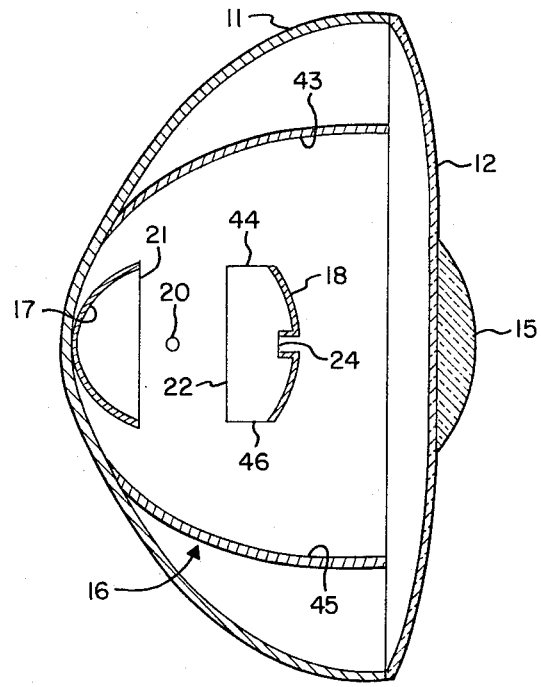
FIG. 8 is a vertical sectional view of still another embodiment of the projector of the invention which provides a light beam having both a substantially horizontal top and bottom portion of increased intensity.
Figure 9:
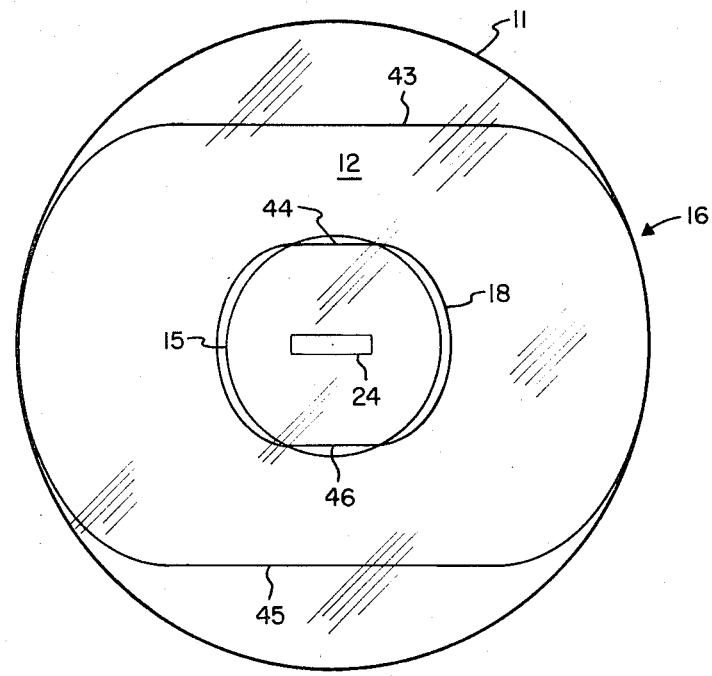
FIG. 9 is a front elevational view of the projector of FIG. 8.

FIGS. 8 and 9 to which reference is now made provides still another embodiment of the present invention. In this embodiment both top and bottom edges of the outer, annular light beam 37 are made substantially flat and of high intensity.

In this embodiment the first rear reflector 16 has both a top portion 43 and a bottom portion 45 having the shape of an anamorphoscope. In other words the entire rear reflector 16 has the shape of an anamorphoscope. In the manner explained before, the top portion of the front reflector 18 may be cut off as shown at 44 as well as its bottom portion as shown at 46.

Therefore, the light beam generated by the projector of FIGS. 8 and 9 has a flat top and bottom portion generally as shown at FIG. 9 of 43 and 45. It is also provided with the rectangular beam portion such as shown at 36 in FIG. 4 of great intensity.

It will of course be realized that the tilting of the axes 40, 41 of the two portions of the light projector as shown in FIG. 5 may be effected also for the embodiments of the invention of FIGS. 6 and 7 and of FIGS. 8 and 9.

The various reflectors of the light projector of the invention may be manufactured in any suitable manner. For example, they may be molded, forged, stamped, welded, machined or electroformed. Suitably, the reflectors may be formed on a mold from a suitable plastic material which may subsequently be coated with a light reflecting material such, for example, as aluminum. It will be understood that other materials such as safety glass, metal, plastic, or ceramic may be used for the apparatus of the invention.

There has thus been disclosed apparatus for projecting radiant energy such as light projector. The projector is so designed that it will project a light beam of predetermined shape such as a rectangular light beam of high intensity surrounded by a ring shaped light beam of less intensity without any light in the central portion. By properly tilting the two portions of the light projector the intense rectangular beam may be tilted or moved with respect to the other beam. There is substantially no divergent light as found in conventional light projectors. Chromatic aberration is minimized due to the fact that most elements are reflectors rather than refractors. Substantially no light is lost because all of the light which would otherwise be projected in undesirable directions is simply redirected into the desired light beam.

What is claimed is:

1. A radiant energy reflecting system for directing radiant energy in predetermined directions, said system comprising:
    a. a source of radiant energy;
    b. a first rear reflector of substantially parabolic shape having its focal point substantially in said energy source;
    c. a second rear reflector of substantially elliptical shape and forming a portion of an ellipsoid disposed between said energy source and said first rear reflector, said second rear reflector having a first focal point substantially in said energy source;
    d. a front reflector of substantially spherical shape, said front reflector having its origin substantially in said energy source and forming a portion of a sphere, said front reflector having an aperture therein of predetermined shape, said second rear reflector having its second focal point substantially in said aperture; and
    e. a lens disposed in the path of the energy beam and having a focal point substantially in said aperture for directing an energy beam in a forward direction having the shape of said aperture, said front reflector extending sufficiently far to prevent energy rays from directly issuing through the opening of said first rear reflector, said second rare reflector directing substantially all energy received thereby through said aperture.

2. A reflecting system as defined in claim 1 wherein said aperture is of rectangular shape and extends substantially across a plane bisecting said reflecting system.

3. A reflecting system as defined in claim 1 wherein the axis of said first rear reflector and the common axis of said second rear reflector, said front reflector and said lens form an angle with each other.

4. A radiant energy reflecting system for directing an energy beam in predetermined directions, said system comprising:
    a. a source of radiant energy;
    b. a first rear reflector having a lower portion having substantially the shape of a paraboloid and an upper portion having substantially the shape of an anamorphoscope, said first rear reflector having its focal point substantially in said energy source;
    v. a second rear reflector of substantially elliptical shape and forming a portion of an ellipsoid and having one of its focal points substantially in said energy source, said second rear reflector having an opening spaced form a plane extending through said energy source and said first rear reflector and substantially at right angles to the said rear reflectors;
    d. a front reflector of substantially spherical shape having its origin substantially in said energy source, said front reflector forming a portion of a sphere extending sufficiently far so as to reflect energy rays which would otherwise pass directly through the opening of said first rear reflector, said front reflector having its top portion cut off and being providing with an aperture of substantially rectangular shape through which an axis extends, said second rear reflector having its second focal point substantially in said aperture;
    e. a window of a material transparent to the energy extending across the opening of said first rear reflector; and
    f. a lens on said window having its focal point substantially in said aperture to project a focused beam in the shape of said aperture.

5. A reflecting system as defined in claim 4 wherein the axis of said first rear reflector and the common axis of said second rear reflector, said front reflector and said lens form an angle with each other.

6. A radiant energy reflecting system for directing radiant energy into predetermined directions comprising:
    a. a radiant energy source;

b. a first rear reflector having substantially the shape of an anamorphoscope and having its focal point substantially in said energy source;
c. a second rear reflector disposed between said energy source and said first rear reflector, said second rear reflector being substantially of elliptical shape and forming a portion of an ellipsoid and having a first focal point substantially in said energy source, said second rear reflector having an opening defined by a plan spaced from and substantially parallel to a plane passing through said energy source and intersecting a symmetrical portion of said first rear reflector;
d. a front reflector of substantially spherical shape having its origin in said energy source and forming a portion of a sphere, said front reflector having its upper and lower portions cut off and extending sufficiently to intersect all energy rays which would otherwise pass through the opening of said first reflector, said front reflector being provided with a substantially rectangular aperture, and the second focal point of said second rear reflector being substantially in said aperture;
e. a window of a material transparent to the radiant energy completely enclosing the opening of said rear reflector; and
f. a lens on said material having its focal point substantially in said aperture for directing an intense, focused beam of energy of the shape of said aperture.

7. A radiant energy reflecting system as defined in claim 6 wherein the axis of said first rear reflector, and the common axis of said second rear reflector, said front reflector and said lens form an angle with each other.

* * * * *